United States Patent [19]

Bains

[11] 4,430,838

[45] Feb. 14, 1984

[54] PANEL JOINTS

[75] Inventor: Gurdip S. Bains, Bonneauville, Pa.

[73] Assignee: Westinghouse Electric Corp., Pittsburgh, Pa.

[21] Appl. No.: 412,367

[22] Filed: Aug. 27, 1982

Related U.S. Application Data

[62] Division of Ser. No. 175,974, Aug. 7, 1980, Pat. No. 4,363,201.

[51] Int. Cl.³ .............................................. E04B 1/40
[52] U.S. Cl. .................................................... 52/584
[58] Field of Search ................... 52/584, 585; 292/342; 5/299, 342

[56] References Cited

U.S. PATENT DOCUMENTS

| 105,771 | 7/1870 | Benjamin | 5/299 |
| 2,490,018 | 12/1949 | Davis | 292/342 |
| 4,189,890 | 2/1980 | Bains et al. | 52/585 |
| 4,299,068 | 11/1981 | Nielsen | 52/584 |

FOREIGN PATENT DOCUMENTS 265089 2/1927 United Kingdom ................ 403/403

*Primary Examiner*—John E. Murtagh
*Attorney, Agent, or Firm*—D. R. Lackey

[57] ABSTRACT

Mid-wall panel joints for joining first and second upstanding wall panel members tightly together with their front surfaces in a common plane. A first embodiment utilizes a combination of spacer members and alignment plates fixed to the rear surfaces of the wall panel members, and an elongated joining member which has first and second columns of elongated slots. The spacer members on the first and second wall panel members extend through spacer head receiving portions of the elongated slots and the joining member is then downwardly advanced to a frictional locking position. A second embodiment utilizes spacer members and a split or divided elongated joining member, adjustably clamped together, which permits alignment of the front surfaces of the wall panel members in a common plane, notwithstanding the joining of wall panel members having different thickness dimensions.

3 Claims, 8 Drawing Figures

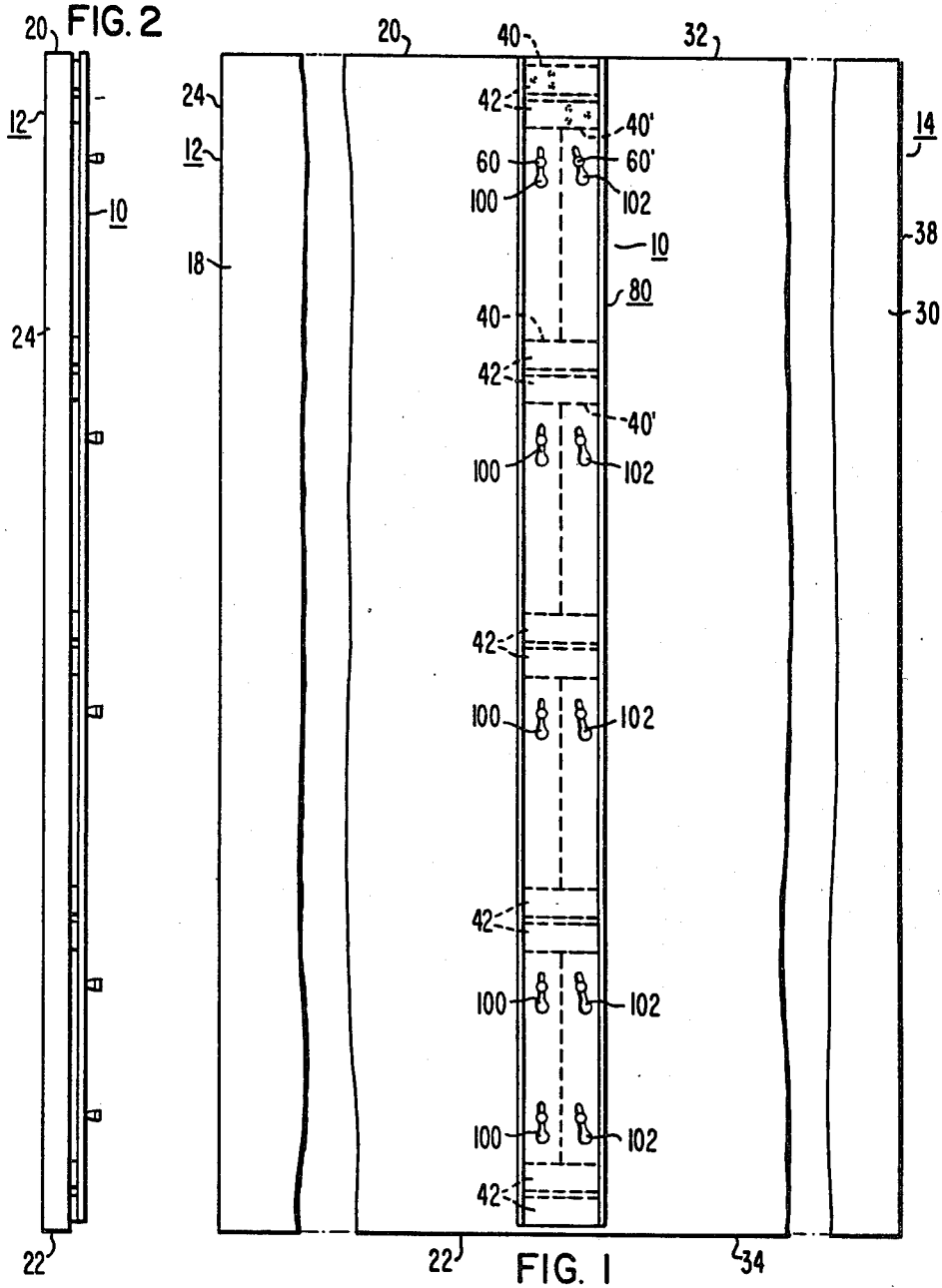

PANEL JOINTS

This is a division of application Ser. No. 175,974, filed Aug. 7, 1980, now U.S. Pat. No. 4,363,201.

BACKGROUND OF THE INVENTION

1. Field of the Invention

The invention relates in general to panel joints, and more specifically to panel joints for joining two upstanding panel members tightly together with their front surfaces disposed in a common plane.

2. Description of the Prior Art

In certain applications, wall panel members are required to be joined together to form a room or cubicle, with the joining hardware concealed. When the width of a wall exceeds a predetermined dimension, it is constructed of two or more in-line panels. The joints between the in-line panels must be tight, and they must remain tight during usage. The front surfaces of the in-line panels must be disposed in a common plane, and the composite wall must be flat without any bowing at the joint. Wall panels formed of wood or other non-metal panels, are relatively thick and heavy, and their surfaces may not be perfectly flat. The weight and non-flatness add to the problem of assembling panels with tight joints. Further, certain types of panels may vary slightly in thickness from panel to panel, which creates a very difficult joining problem as the slightest deviation in panel thickness is noticeable when two panels are joined in-line with concealed hardware.

It would thus be desirable to provide new and improved panel joints for relatively large, heavy panels which enable the panels to be quickly and tightly joined in-line with the desired orientation of the front panel surfaces in a common plane. It would further be desirable to remove or reduce any bow or out-of-flatness condition of the panel members, especially at the critical joint area, without increasing assembly time. Still further, it would be desirable to provide a new and improved panel joint which will quickly enable the assembler to compensate for a difference in thickness of the panels to be joined.

SUMMARY OF THE INVENTION

Briefly, the present invention includes new and improved panel joints for joining relatively thick wall panel members, such as wood, or other non-metallic materials, in-line with concealed hardware. The joints are quickly and easily formed by an assembler located adjacent to the front sides of the panels.

In a first embodiment, a new and improved joint is disclosed for use when the panel thickness dimensions will be substantially uniform from panel to panel. Metallic alignment plates and spacer members are fixed to the back surfaces of first and second wall panel members adjacent to the edges to be butted together, and the panel members are shipped to the job site, along with a single metallic joining member. The assembler positions the first and second wall panel members, such that the alignment plates, which extend outwardly from their associated panel towards the other panel, contact the rear surface of the other panel. The joining member has first and second columns of elongated openings or slots which engage the spacer members on the first and second panel members. The assembler then pounds the metallic joiner member vertically downward, which forces the joining member tightly against the alignment plates to remove any bow or waviness in the panels, and it forces the two adjoining edges tightly together by virtue of slots in one of the vertical columns which are angled or inclined slightly from the vertical.

In a second embodiment, a new and improved joint is disclosed for use when the panel thickness dimension may vary from panel to panel. Spacer members are fixed to the rear surfaces of first and second panel members, adjacent to the edges to be butted together. A metallic joining member is provided which has first and second portions or elements, which elements are clamped together to enable the joining member to function as a single member. Elongated slots are provided in each of the first and second elements. In a preferred embodiment, the spacers are fixed to one of the panel members through the elongated slots in one of the elements to slideably fix the joining member thereto for shipment. At the job site, the assembler places the first and second wall panels in position adjacent to one another and raises the joining member to allow the spacer members on the other panel to enter and be captured by the slots. The assembler then pounds the joining member vertically downward, to pull the adjacent edges tightly together. If the front surfaces of the two panels are in different planes due to the panels having slightly different thickness dimensions, the joining member is released by pounding it upwardly. The clamping means is loosened to permit the relative positions of the two elements of the joining member to be adjusted according to the variation in panel thickness. The clamping means is retightened and the panels are then reassembled.

BRIEF DESCRIPTION OF THE DRAWINGS

The invention may be better understood, and further advantages and uses thereof more readily apparent when considered in view of the following detailed description of exemplary embodiments, taken with the accompanying drawings in which:

FIG. 1 is a front elevational view of first and second upstanding wall panel members joined with a panel joint constructed according to a first embodiment of the invention;

FIG. 2 is an end elevational view of the upstanding wall panel members shown in FIG. 1;

FIG. 3 is a plan view of the upstanding wall panel members show in FIG. 1;

DESCRIPTION OF THE PREFERRED EMBODIMENTS

Figure 4:
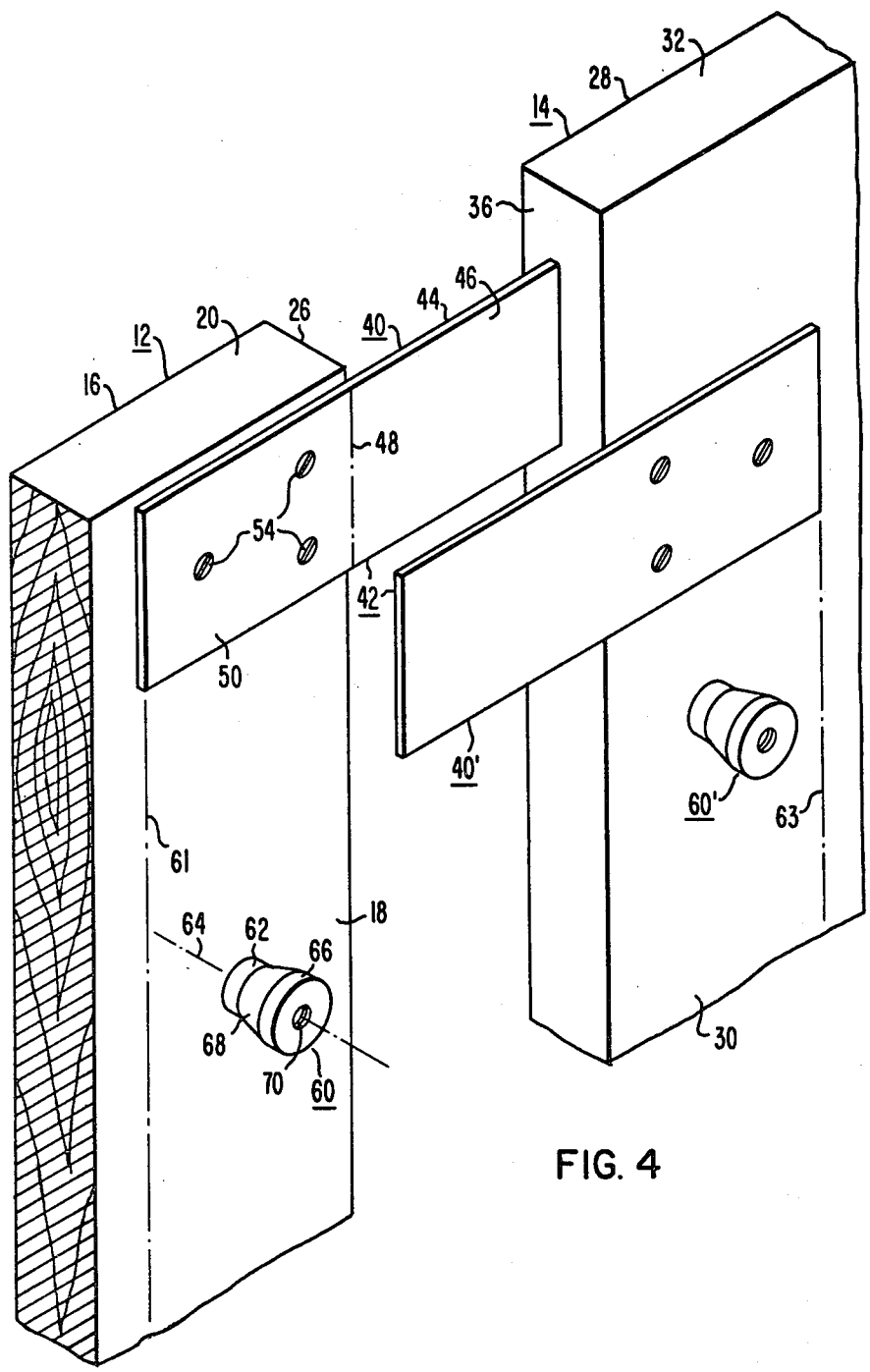
FIG. 4 is a fragmentary, perspective view illustrating elements of the joint shown in FIGS. 1-3, and a step in the assembly of the joint.

FIG. 1 is an elevational view of a panel joint 10 constructed according to the teachings of the invention, with FIG. 2 being an end view of joint 10, and FIG. 3, a plan view. Joint 10 is especially suitable for joining wall panel members which have a uniform thickness dimension from panel to panel, but which may have a slight bow or waviness when viewed from an edge. Non-flat panels joined in-line with concealed hardware make an unattractive joint, if the panel surfaces are not aligned along the entire length of the joint. The joint of the present invention forces such alignment.

More specifically, panel joint 10 is an in-line joint, as opposed to an angular joint, with joint 10 joining first and second upstanding wall panel members 12 and 14. Wall panel members 12 and 14 are relatively large and heavy panels, formed of a material such as wood, or a wood substitute. Panel members 12 and 14 form a wall, or a portion of a wall, such as a wall for a cubicle which may be used as the cab for an elevator car. Wall panel member 12 has front and rear major flat surfaces 16 and 18, respectively, top and bottom edges 20 and 22, respectively, and first and second vertically extending side edges 24 and 26, respectively, with the second side edge 26 also being referred to as an "adjacent" edge, because it is the edge to be butted against wall panel member 14. Wall panel member 14 has first and second major flat surfaces 28 and 30, respectively, top and bottom edges 32 and 34, respectively, and first and second vertically extending side edges 36 and 38, respectively, with the first side edge 36 also being referred to as an "adjacent" edge. Joint 10 joins wall panel members 12 and 14 in-line with their front surfaces 16 and 28 aligned in a common vertical plane.

Joint 10 includes a plurality of metallic alignment plates 40 and 40' fixed in vertically spaced staggered relation to the rear surfaces 18 and 30, respectively, of the first and second wall panel members 12 and 14. The metallic alignment plates are fixed to the adjacent edges 26 and 36, with a portion of each alignment plate extending outwardly past the adjacent edge of the panel member it is fixed to, such that it overlaps and contacts the rear surface of the other panel member. Alignment plates 40 and 40' alternate with one another such that there is no interference between them. Alignment plates 40 and 40' are preferably grouped to provide a plurality of pairs 42, with each pair 42 including an alignment plate 40 fixed to panel member 12, and an alignment plate 40' fixed to panel member 14. The alignment plates of each pair 42 are closely spaced, with a larger spacing between adjacent pairs.

FIG. 4 is a perspective view of the uppermost pair 42 of alignment plates 40 and 40' as they would appear during a step in the formation of joint 10 shown in FIGS. 1, 2, and 3. FIG. 4 more clearly illustrates an exemplary construction of an alignment plate. Since alignment plates 40 and 40' may be of like construction, only alignment plate 40 will be described in detail. Alignment plate 40 is formed from a metallic plate or sheet, such as 0.188 inch thick steel. Alignment plate 40 has a generally elongated rectangular configuration which has a length dimension of about 6 inches, and a width dimension of about 2 inches. Plate 40 has first and second major flat opposed surfaces 44 and 46, respectively, with a plurality of holes formed therein which are countersunk on side 46. Imaginary center line 48 divides plate 40 into first and second halves 50 and 52, respectively, with the plurality of openings or holes being formed in the first half 50. Flat head screws 54 secure each alignment plate 40 to the rear surface 18 of the first wall panel member 12, with care being taken to ensure that the surface of each flat head screw 44 does not extend outwardly past the second major surface 46 of alignment plate 40.

Joint 10 additionally includes a plurality of spacer members 60 and 60' fixed in vertically spaced relation to the rear surfaces 18 and 30, respectively, of the first and second wall panel members 12 and 14, along their adjacent edges 26 and 36, respectively. In a preferred embodiment, spacer members 60 and 60' are located at like vertical positions, with spacer member 60 preferably being located between panel edge 26 and an imaginary vertical line 61 which interconnects the left hand edges of alignment plates 40, as viewed in FIG. 4. In like manner, spacer member 60' is preferably located between panel edge 36 and an imaginary vertical line 63 which interconnects the right hand edges of alignment plates 40'.

Since spacer members 60 and 60' may be of like construction, only spacer member 60 will be described in detail. More specifically, spacer member 60 is a metallic member which includes a smooth, round shank portion 62 having a predetermined diameter, such as about 0.5 inch, and a length dimension in the direction of the longitudinal axis 64 which is slightly greater, i.e., about 0.005 inch greater, than the thickness dimension of the alignment plates 40 plus the thickness dimension of a metallic joining member to be hereinafter described. Spacer member 60 further includes a smooth round head portion 66 having a predetermined diameter which is larger than the diameter of shank portion 62, such as about 0.75 inch, and a length dimension of about 0.125 inch. Instead of the shank 62 and head 66 joining at right angles relative to one another such that the underside of the head forms a flange, an angled or tapered cam surface 68 is provided between shank 62 and head 66. Cam surface 68 defines a predetermined angle with shank 62, such as an angle of about 25°. The longitudinal length of cam surface 68, i.e., measured along the longitudinal axis 64 of spacer member 60, is about 0.25 inch.

Spacer member 60 is secured to the back surface 18 of panel member 12 via suitable fastener means. As illustrated, spacer member 60 may have an opening coaxial with its longitudinal axis 64 for receiving a screw 70. A pilot opening may be pre-drilled in panel member 18 to accurately locate and guide screw 64. Spacer members 60 are attached to the back surface 18 of wall panel member 12 with the centers of the spacer members all being located on a common vertical imaginary line spaced a predetermined dimension from the adjacent edge of the wall panel member.

Figure 6:
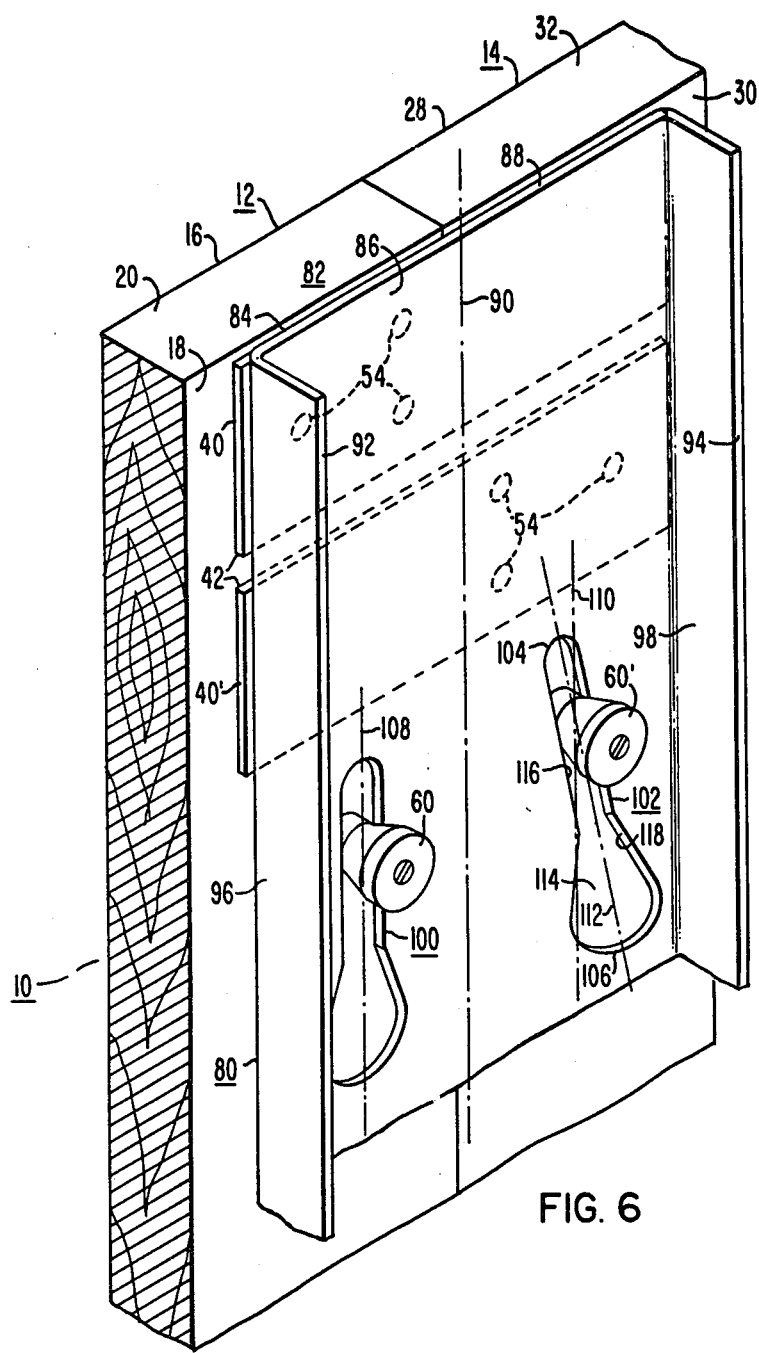
FIG. 6 is a view similar to that of FIG. 5, illustrating the joining member in its downwardly forced frictional locking position.

Joint 10 is completed by a joining member 80, best shown in FIG. 6. FIG. 6 is a fragmentary, perspective view of joint 10, after the completion thereof. Joining member 80 is formed from an elongated metallic plate member 82, such as a steel plate, having first and second major opposed flat surfaces 84 and 86, respectively. Plate member 82 further includes upper and lower ends, with reference to the view shown in FIG. 6, such as upper end 88, and a longitudinal axis or center line 90 which extends between its ends. Plate member 82 also has first and second side edges 92 and 94, respectively. As illustrated, plate member 82 may be bent adjacent to side edges 92 and 94 to provide leg portions 96 and 98 which extend vertically outward from major side or surface 86. Leg portions 96 and 98 function to stiffen the elongated joining member 80, and may be omitted if plate member 82 is formed from steel plate which has the required mechanical characteristics without additional stiffening. A metallic block member (not shown) may be welded adjacent to the upper end of the metallic joining member, for use in hammering the joining member 80 into, or out of, its frictional locking position to be hereinafter described. The length dimension of joining member 80 is selected such that the joining member will not extend below the bottom edges of the panel members, after the joining member 80 is disposed in its locking position.

A plurality of first elongated slots or openings 100 are provided on one side of longitudinal center line 90, and a plurality of second elongated slots or openings 102 are provided on the other side of center line 90. The longitudinal axes of the first slots 100 are vertically oriented, and the longitudinal axes of the second slots 102 are inclined such that the upper end 104 of each slot 102 is closer to the longitudinal center line 90 than the lower end 106 of the slot.

The longitudinal axes of the first slots 100 are all located on imaginary line 108, which is parallel to and spaced from the longitudinal center line 90. The second elongated slots 102 have centers which are all located on an imaginary line 110 which is parallel to and spaced from longitudinal center line 90. Unlike slots 100, however, the longitudinal axes 112 of slots 102 are not vertically oriented, but they are slightly inclined, such as by an angle of about 4° from the vertical line 110.

Slots 100 and 102 each have an enlarged first portion at its lower end, a second portion which has parallel sides, which starts at its upper end, and a third portion in the form of a tapered transition which extends between the enlarged first portion and the second portion. For example, slot 102 has an enlarged first portion 114 at its lower end 106, a second portion 116 starting at its upper end 104, which portion has parallel sides, and a tapered intermediate transition or third portion 118 which starts at the enlarged first portion 114 and tapers inwardly to the second portion 116. Enlarged portion 114 is constructed such that its lower end is in the form of a half circle, with the transition 118 extending from the ends of the half circle to the second portion 116. The diameter of the half circle is selected such that the head portion of the spacer member 60' will extend therethrough without interference.

Figure 5:
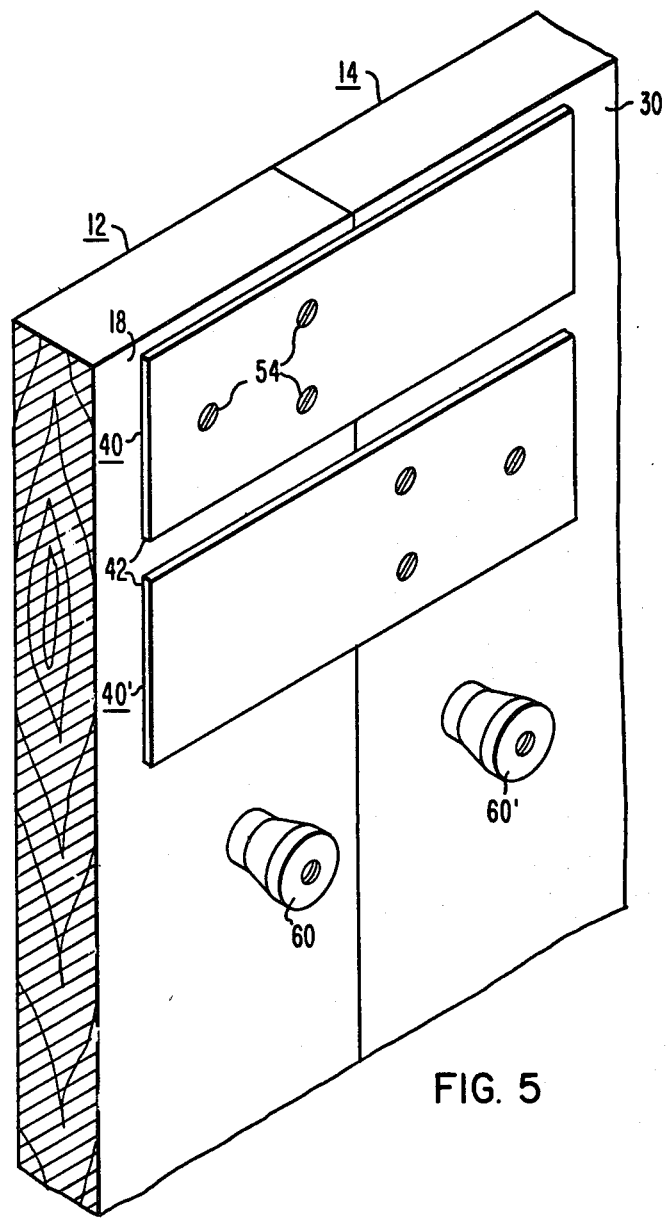
FIG. 5 is a view similar to that of FIG. 4, illustrating the next assembly step.

Referring again to FIG. 4, the first step in forming joint 10 is illustrated. The assembler uprights the panel members 12 and 14 in approximately the position they will assume when they are assembled. For ease in positioning the alignment plates 40 and 40' properly, panel members 12 and 14 may initially be angled slightly such that they provide an angle slightly less than 180°, with the assembler being located on this side of the angle. When the adjoining edges 26 and 36 are just about touching, the assembler straightens the panels to cause the angle to swing to 180°, which will bring the alignment plates 40 and 40' against the rear surfaces 30 and 18, respectively, of the panel members, as shown in FIG. 5. Joining member 80 is then placed in position such that the spacer members 60 and 60' enter the enlarged portions of the elongated slots 100 and 102, respectively, and are captured thereby. The assembler then strikes the top edge of the joining member 80, or the special block provided for this purpose, with a hammer, forcing the joining member 80 into a downwardly displaced frictional locking position, as shown in FIG. 6.

As joining member 80 is forced vertically downward, the tapered transitions of slots 100 and 102 make it easy to capture the spacer members 40 and 40' in the slots, even when the panel members are bowed. Continued downward movement of joining member 80 results in the narrowing taper of transition 118 camming the joining member 80 into tight engagement with the alignment plates 40 and 40'. Joining member 80, being straight and flat, cams tightly against the alignment plates, forcing the alignment plates 40 and 40' into a common plane. Since surfaces 44 of the alignment plates, and thus the rear surfaces 18 and 30 of the panel members are all in a common plane, especially in the joint area, their front surfaces 16 and 28 are forced into a common plane at the joint area, with no mismatch or step. Continued downward movement of joining member 80 to its final locking position causes the adjoining edges of the panel members 12 and 14 to be drawn tightly together due to the inclined slots 102 acting upon the spacer members 60' to move wall panel member 14 tightly against wall panel member 16.

Figure 7:
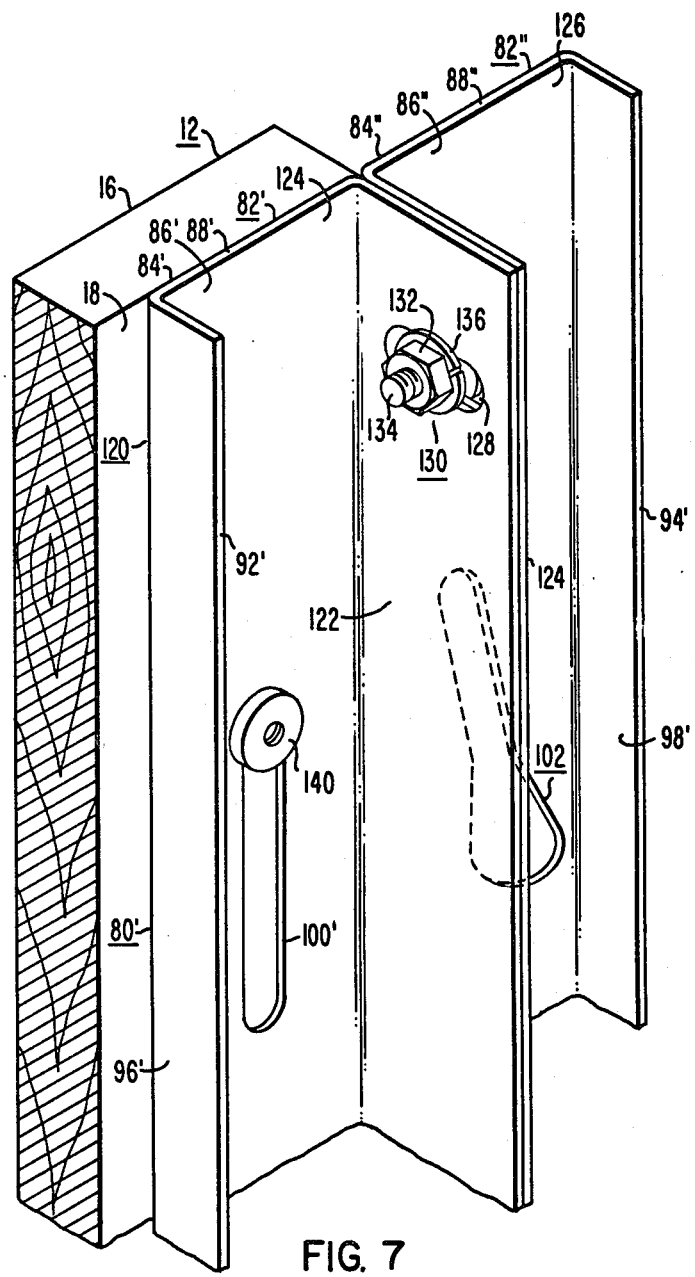
FIG. 7 is a fragmentary, perspective view of joint elements constructed according to another embodiment of the invention.
Figure 8:
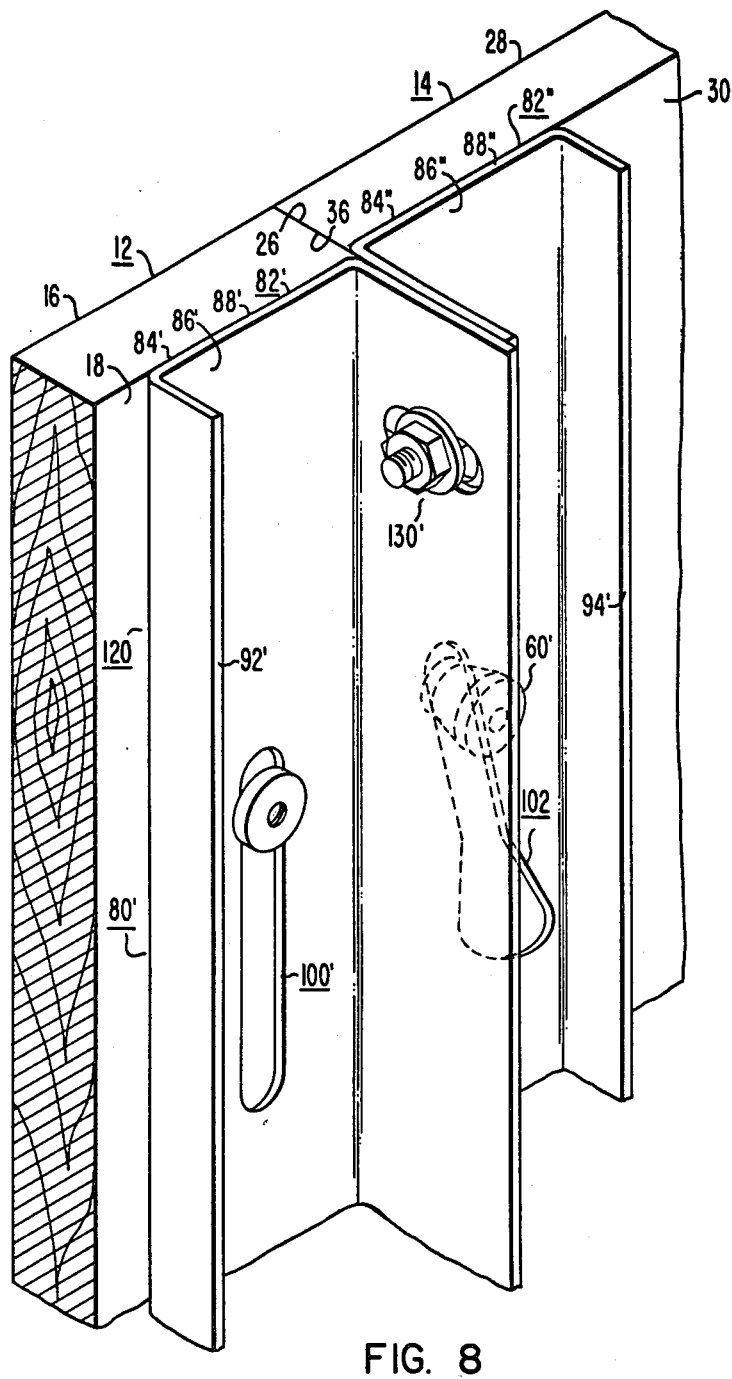
FIG. 8 is a view similar to that of FIG. 7, illustrating the complete joint, with the joining member disposed in its downwardly displaced frictional locking position.

In the embodiment of the invention shown in FIGS. 1-6, the thickness dimensions of the wall panel members were assumed to be substantially uniform from panel to panel, such that when the rear surfaces of the panel members are straightened and aligned in a common plane by the alignment plates and joining member, the front surfaces will also be automatically aligned in a common plane. Certain types of wall panel members, however, may have a slight variation in panel thickness dimension from panel to panel. FIGS. 7 and 8 are fragmentary, perspective views of a panel joint 120 constructed according to another embodiment of the invention, which may be used to align the front surfaces of two in-line panel members in a common plane, notwithstanding a difference in their thickness dimensions. In general, the major differences between this embodiment of the invention and the embodiment of FIGS. 1-6 is the elimination of the alignment plates 40 and 40', and the dividing of the joining member 80 into first and second parts or elements along the longitudinal centerline 90. The first and second parts or elements of the joining member are adjustably clamped after the elements are adjusted relative to one another to accommodate the specific thickness dimensions of the wall panel members to be butted together and joined. Components in FIGS. 7 and 8 which may be the same as those in FIGS. 1-6 will be given like reference numerals, and will not be described again in detail.

More specifically, joint 120 includes a joining member 80' having first and second separate portions 82' and 82" with each portion having a substantially U-shaped cross-sectional configuration wherein portion 82' includes spaced leg portions 96' and 122, and a flat connecting bight portion 124. Portion 82" includes spaced leg portions 124 and 94', and a flat connecting bight portion 126. Leg portions 122 and 124 have aligned openings therein when the side surfaces of these leg portions are butted together, with additional aligned openings being vertically spaced at predetermined intervals. One of the openings of the aligned pairs is horizontally elongated, such as the horizontally elongated slot or opening 128 shown in leg portion 122. Suitable adjustable clamping or fastener means 130 link the two portions via the aligned openings, such as a nut 132, bolt 134, and lock washer 136.

The elongated slots in the flat bight portions of the two elements of the joining member 80' may be the same as in the embodiment set forth in FIGS. 1-6; or, as illustrated in FIG. 7, slot 100 may be modified to provide a slot 100' which has no enlarged portion and no tapered transition. The fact that this embodiment of the invention does not utilize the alignment plates of the first embodiment makes it possible to assemble the joining member 80' with panel member 16 at the factory, and thus one of the panel members and joining member 80' may be shipped as a unit. This has the advantage in that all elements of the joint are fixed to the panel members for shipment, precluding the loss of any of the essential joint elements.

If the slots in both joint elements are identical to those in the embodiment of FIGS. 1-6, the spacer members would also be the same as in the first embodiment. However, if the modified slots 100' are used, then a spacer member 140 would be used, instead of spacer member 60. Spacer member 140 includes a shank and head portion, but it does not have the tapered transition of spacer member 60. Spacer members 140 are inserted through slot 100' and then fastened to the rear of wall panel member 12, to capture joining member 80' but with sufficient clearance to allow it to move in a snug but slideable relation.

As illustrated in FIG. 7, joining member 80' is shipped to the job site with the first and second portions being initially set to join two panel members having the same thickness dimension. If it is found by the assembler in the field that panel member 14 is not as thick as panel member 12, or it is thicker than panel member 12, the assembler loosens the plurality of fastener means and adjusts the relative positions of the first and second portions or elements 82' and 82" to accommodate the difference in thickness. The fastener means is then re-tightened. This adjustment step may be accomplished with, or without panel member 14 connected to panel member 12, depending upon the easiest approach considering the space available to the assembler. Similar to the first embodiment, when joining means 80' is hammered downwardly to its frictional locking position, panel 14 will be cammed tightly against joining member 80' due to the taper or cam on the spacers 60' and the tapered portion of the slots 102, and the adjacent edges of the wall panel members 12 and 14 will be drawn tightly together due to the inclined slots 102 and spacer members 60'.

I claim as my invention:

1. A panel joint for quickly assembling, and disassembling, two upstanding, in-line non-metallic panel members while aligning front surfaces thereof in a common plane, notwithstanding different thickness dimensions, via a vertical motion of a joining member concealed on the rear surfaces, comprising:

first and second adjoining, upstanding wall panel members having front and rear surfaces, and adjacent edges, with said adjacent edges in contact with one another, a plurality of spacer members having head and shank portions fixed in vertically spaced relation to the rear surfaces of said first and second wall panel members, along their adjacent edges, and an elongated joining member having first and second joint elements each having first and second leg portions disposed at right angles to one another to define longitudinally extending corner portions, each of said first leg portions of said first and second elements having a plurality of spaced elongated slots, with the slots in said first element including sides parallel with its longitudinally extending corner, and with the slots in said second element including sides which are parallel with one another but inclined relative to its longitudinally extending corner, said first and second elements being in contact with said first and second wall panel members, respectively, with the spacer members on said first wall panel member captured by the slots in the first element, and the spacer members on said second wall panel member captured by the slots in the second element, said second leg portions of the first and second joint elements including openings therein, with the openings in at least one of the second leg portions of the first and second joint elements being elongated in a direction selected to provide the adjustment of one wall panel member relative to the other, to orient their front surfaces in a common plane, said second leg portions of the first and second joint elements having flat side surfaces facing the other wall panel member, said first and second joint elements being positioned relative to one another to align the front surfaces of the first and second wall panel members in a common plane, with the flat surfaces of the second leg portions being in surface-to-surface contact, and with the openings in one of the second leg portions being aligned with openings in the other second leg portion, and clamping means releasably clamping the second leg portions of said first and second joint elements together to maintain the selected relative positions thereof, said clamping means including fastener means comprising a plurality of vertically spaced nut and bolt combinations which couple the contacting second leg portions via said aligned openings, said joining member being in a downwardly displaced frictionally locked position, with the inclined slots in the second joint element forcing the associated spacer members on the second wall panel member towards the first wall panel, to urge the adjoining edges of the first and second wall panel members tightly together, said joining member being releasable from said locked position by an upward force applied thereto.

2. The panel joint of claim 1 wherein the spacer members on at least the second wall panel member have a tapered cam surface which tapers inwardly from the head portion to the shank portion, and the elongated slots of the second joint element have an enlarged spacer head receiving first portion, a second portion having parallel sides, and a third portion which defines a tapered transition between the first and second portions, and wherein the tapered transitions of the elongated slots and the tapered cam surfaces of the spacer members facilitate capture of the spacer members in the slots and promote flattening of the second wall panel member.

3. The panel joint of claim 1 wherein the spacer members fixed to the first wall panel member extend through the plurality of slots in the first joint element such that said joining member is captured by, but vertically slideable relative to, the first wall panel member, and wherein the slots in the second joint element include an enlarged portion which permits releasable capture of the head portions of the spacer members fixed to the second wall panel member.

* * * * *